(12) United States Patent
Dietz et al.

(10) Patent No.: US 10,260,919 B2
(45) Date of Patent: Apr. 16, 2019

(54) ULTRASOUND MEASURING APPARATUS AND METHOD FOR MEASURING THE FLOW RATE OF A FLUID

(71) Applicant: SICK ENGINEERING GMBH, Ottendorf-Okrilla (DE)

(72) Inventors: Toralf Dietz, Ottendorf-Okrilla (DE); Arnd Schlicke, Ottendorf-Okrilla (DE); Henri Kirmse, Ottendorf-Okrilla (DE)

(73) Assignee: SICK ENGINEERING GMBH, Ottendorf-Okrilla (DE)

( * ) Notice: Subject to any disclaimer, the term of this patent is extended or adjusted under 35 U.S.C. 154(b) by 1 day.

(21) Appl. No.: 15/639,440

(22) Filed: Jun. 30, 2017

(65) Prior Publication Data
US 2018/0010942 A1    Jan. 11, 2018

(30) Foreign Application Priority Data
Jul. 5, 2016    (DE) .................. 10 2016 112 295

(51) Int. Cl.
G01F 1/66    (2006.01)

(52) U.S. Cl.
CPC .............. G01F 1/667 (2013.01); G01F 1/662 (2013.01)

(58) Field of Classification Search
CPC ...................................... G01F 1/66; G01F 1/00
See application file for complete search history.

(56) References Cited

U.S. PATENT DOCUMENTS

| | | | | |
|---|---|---|---|---|
| 3,940,985 A * | 3/1976 | Wyler | ..................... | G01F 1/667 73/861.31 |
| 4,300,401 A * | 11/1981 | Pedersen | ................. | G01F 1/666 700/282 |
| 7,706,986 B2 * | 4/2010 | Frohlich | .............. | G01N 29/024 702/48 |
| 7,752,919 B2 * | 7/2010 | Straub, Jr. | ............... | G01F 1/667 73/861.27 |

(Continued)

FOREIGN PATENT DOCUMENTS

| | | |
|---|---|---|
| DE | 2936909 A1 | 3/1980 |
| EP | 2 310 808 B1 | 5/2013 |

OTHER PUBLICATIONS

Carolan, et al., "Practices and Emerging Trends in Liquid Flow Computing to Improve Accuracy and Reliability for Custody Transfer", Willowglen Systems, Inc., CSHM 2014 Conference, Paper No. 49, Stream 6.

(Continued)

*Primary Examiner* — Jewel V Dowtin
(74) *Attorney, Agent, or Firm* — Nath, Goldberg & Meyer; Jerald L. Meyer; Stanley N. Protigal

(57) ABSTRACT

An ultrasound measuring apparatus for measuring the flow rate of a fluid in a conduit having two measurement systems is provided that each have at least one pair of ultrasound transducers that span a measurement path between them and that each have a control unit to determine transit times from ultrasound transmitted and received with and against the flow. In this respect, the control units are each configured to fix measurement times for a transit time determination on a measurement path autonomously and independently of one another in accordance with a rule that produces a respective different sequence of the measurement times in both measurement systems.

12 Claims, 2 Drawing Sheets

(56) References Cited

U.S. PATENT DOCUMENTS

| | | | | |
|---|---|---|---|---|
| 8,291,773 B2 * | 10/2012 | Dietz | ............... | G01F 1/662 |
| | | | | 73/861.31 |
| 9,752,424 B2 * | 9/2017 | Minnock | ............... | B63G 8/001 |
| 9,976,885 B2 * | 5/2018 | Zhang | ............... | G01F 1/66 |
| 2011/0277558 A1 * | 11/2011 | Dietz | ............... | G01F 1/662 |
| | | | | 73/861.31 |
| 2014/0345391 A1 | 11/2014 | Watanabe et al. | | |

OTHER PUBLICATIONS

Office Action dated Jan. 27, 2017 issued in corresponding German Application No. 10 2016 112 295.5.

* cited by examiner

ULTRASOUND MEASURING APPARATUS AND METHOD FOR MEASURING THE FLOW RATE OF A FLUID

FIELD

The invention relates to an ultrasound measuring apparatus for measuring the flow rate of a fluid in a conduit, the ultrasound measuring apparatus comprising a first measurement system that has at least one pair of first ultrasound transducers that span a measurement path between one another and that has a first control unit to determine transit times of ultrasound transmitted and received with and against the flow on the measurement path; and a second measurement system that has at least one pair of second ultrasound transducers that span a measurement path between one another and that has a second control unit to determine transit times of ultrasound transmitted and received with and against the flow on the measurement path. The invention further relates to a method for measuring the flow rate of a fluid in a conduit A method of measuring the flow rate of a fluid in a conduit, wherein transit times of ultrasound transmitted and received with and against the flow are determined on at least one measurement path of a first measurement system and on at least one measurement path of a second measurement system and the flow rate is calculated from the transit times.

BACKGROUND

Flow rates in pipeworks and passages can be determined by means of ultrasound measurement technology using the transit time difference method. An important and demanding area of application is represented by gas meters for natural gas pipelines where, due to the huge gas volumes conveyed and to the value of the resource, even the smallest deviations in the measurement precision correspond to very noticeable economic values.

A known measurement principle is shown in FIG. 5. As essential components of a conventional measurement apparatus 110, two ultrasonic transducers 118, 120 are arranged at an angle in the wall of a conduit 112 in which a fluid 114 flows in the direction of the arrow 116. Ultrasonic pulses are output and received transversely to the flow of the fluid on the measurement path between the ultrasonic transducers 118, 120, with the ultrasonic transducers 118, 120 operating alternately as transmitter and receiver. The ultrasonic signals transported through the fluid are accelerated in the direction of flow and are decelerated against the direction of flow. The resulting transit time difference is calculated using geometrical parameters to form a mean flow rate of the fluid. Together with the cross-sectional area, the operating volume flow results from this which is the measurement variable of interest for a fluid billed by volume, for example. The geometrical relationships are described by the following variables:

v: flow rate of the fluid in the line
L: length of the measurement path between the two ultrasonic transducers
α: angle at which the ultrasonic transducers transmit and receive
Q: volume flow
D: diameter of the line
$t_v$: transit time of the ultrasound with the flow and
$t_r$: transit time of the ultrasound against the flow The following relationships result from this for the sought variables v and Q:

$$v = L/(2 \cos \alpha)(1/t_v - 1/t_r)$$

and $$Q = v \cdot \tfrac{1}{4} D^2 \pi$$

The local, mean flow speed at the position of the measurement path is accordingly determined in this manner. However, this only produces an accurate measured value with uniform flows. A plurality of measurement paths are therefore geometrically distributed over the cross-section of the conduit for demanding applications. A more precise value for the mean flow rate is then determined over the total cross-sectional area by a weighted addition of the measured values of the individual measurement paths. A series of measurement path configurations or layouts are presented in the standard ISO 17089-1.

Ultrasound measurement apparatus are known that are made up of a plurality of subsystem each having one or more measurement paths. This reduces the complexity in the individual subsystems and provides redundancy. However, signal interference can occur that impairs the quality of the received ultrasound signals.

Such a measurement apparatus is known from EP 2 310 808 B1. It comprises a plurality of transducer pairs that are operated in two groups of a respective one set of control electronics. In this respect, the two control electronics are coupled to one another communicationally and coordinate the activity of their transducer pairs such that the two subsystems are never simultaneously active and thus mutual interference of ultrasound measurements on the respective measurement paths are precluded.

This communication and synchronization admittedly solves the problem of signal interference, but has the consequence that always only one subsystem can make a measurement. A strictly sequential operating regime thus results that only utilizes half the measurement time per subsystem. The redundancy of the systems is furthermore lost since in the event of defect or of other errors in a subsystem, the loss of the communication or of the synchronization is also accompanied by a loss of the required coordination and the operational reliability is thus called into question.

SUMMARY

It is therefore the object of the invention to improve the reliability of an ultrasound measurement apparatus composed of a plurality of subsystems.

This object is satisfied by an ultrasound measurement apparatus and by a method for measuring the flow rate of a fluid in a conduit respectively. The ultrasound measurement apparatus has a first measurement system and a second measurement system respectively having at least one ultrasound transducer pair and preferably a plurality of such ultrasound transducer pairs with a measurement path spanned between them, and a control unit so that each measurement system forms a single-path or multi-path flowmeter. The transit time difference is determined from the transit times determined by ultrasound signals on a measurement path and a value for the flow rate is determined from said transit time difference. The invention now starts from the basic idea that the measurement operation of the two measurement systems is autonomous and independent of one another. There is therefore no synchronization or communication between the control units, at least not for the organization of the measurement procedure. Each control unit and thus each measurement system has an autonomous time organization for the measurements on its measurement paths and fixes the measurement times itself. This takes place according to a rule that results in a respective different sequence of measurement times in the two measurement systems. The two sequences preferably differ in this respect such that, after a random collision, that is after a simultaneous or overlapping measurement of both measurement systems, a further collision is particularly unlikely or only occurs again after a longer time or after a large number of further measurements.

The invention has the advantage that metrologically and statistically independent measurement systems or subsystems are achieved that represent a metrological redundancy. The measurement systems are not subject to any restrictions with respect to availability; that is, they provide a high information density without mutually disturbing or interfering with one another. The omission of a synchronization and of communication not only reduces the effort and/or cost, but also the error probability of the total system since thus no failure of the communication can occur at all. There is thus a real redundancy in the sense that in the event of a failure of one measurement system, the other measurement system is not influenced and the total system therefore remains able to work. The synchronization is replaced with suitable measures that maintain its advantages without having to accept its disadvantages.

The first control unit and/or the second control unit is preferably configured to randomly fix at least one measurement time. The measurement times that are thereby randomly distributed ensure that individual measurements in the two measurement systems can admittedly possibly overlap in time and that thus signal interference can occur. Unlike two measurement systems working with an identical time behavior, it is, however, extremely unlikely that this will frequently repeat. Pseudo random numbers are preferably algorithmically generated with respect to the transit time, with it being ensured, for example, by different starting values (seeds) in the measurement systems that the random sequences are different. It is, however, also conceivable to predefine a respective table having a random sequence. The random distribution of the measurement times is preferably restricted to a predefined time interval so that two measurements observe a temporal minimum interval and maximum interval from one another. This can also be expressed such that the measurement times are randomly delayed with respect to a regular time pattern. It is sufficient if only one of the control unit randomly delays its measurement times and the other control unit works with regular measurement times.

The first control unit and/or the second control unit is preferably configured to fix most or all of the measurement times randomly. There are otherwise longer sequences of regular measurement times that then all overlap in both measurement systems in the most unfavorable scenario. This regularity is interrupted if at least most of the measurement times are randomly delayed.

The first control unit and the second control unit are preferably configured to fix the number of measurement times per time unit in the measurement systems coprime to one other. In this embodiment, the measurement times are thus regularly distributed within a measurement system, but such that a collision is not followed by a further collision for as long as possible. This is done, for example, by coprime numbers of measurements per time unit, for example ten measurements in the first measurement system and eleven measurements in the second measurement system. In another respect, sequences of measurement times in both measurement systems can also be construed independently of conditions such as regularity or coprime number. The aim in this respect is to locate two sequences that leave gaps between two collisions everywhere that are as large as possible with any desired mutual temporal displacement.

The first control unit and/or the second control unit is/are preferably configured to additionally delay at least some measurement times by a random duration. The approach of regular, but different temporal sequences of the measurement times is therefore combined with the random approach here. The random portion should remain relatively small because otherwise the systematic breakup is destroyed by a skillful choice of regular, different sequences and a purely random system effectively arises.

The first control unit and/or the second control unit is/are preferably configured to carry out transit time measurements in each case in one sequence through all measurement paths of the associated measurement system, with the sequence being randomly fixed. This is naturally only sensible for measurement systems having a plurality of measurement paths. The disturbing effect of signal interference depends on the geometrical position of the active measurement pats on which a collision arises. Disturbance effects are thus further reduces when the local sequence of the measurements on the measurement paths is also varied. The measurement path is preferably not completely randomly selected, but rather, for example by drawing without replacement, only the sequence so that each measurement path in a measurement cycle is used equally frequently. It is an alternative only to fix the sequence in advance, but to select randomly in each case the measurement path with which the measurement starts within this sequence.

A higher ranking control is preferably provided that receives measured values of the first control unit and of the second control unit and compares or offsets them with one another. Errors in the measurement systems can thereby be discovered. A common offset practically allows a multi-path numerator to be created from all the measurement paths of both measurement systems. In this respect, one of the control units can also take over the function of the higher ranking control. The forwarding of measurement results can take place in any desired processing stage, from the raw ultrasound signals up to flow values. However, the measurements themselves are still not synchronized or otherwise coordinated between the measurement systems; only measurement results are passed on or exchanged.

The first measurement system and the second measurement system preferably each have two pairs of ultrasound transducers or four pairs of ultrasound transducers each and thus two or four measurement paths. A 2+2 flowmeter or a 4+4 flowmeter arises. Measurement path layouts having two or four paths balance very well between effort and/or cost and measurement accuracy and are therefore also particularly suitable as redundant measurement systems. The measurement systems can, however, alternatively, also have a different number of measurement paths. In this respect, an uneven number of measurement paths such as 4+2 or 4+1 is also conceivable.

At least one third measurement system is preferably provided that has at least one pair of third ultrasound transducers that each span a measurement path between each other and that has a third control unit to determine transit times of ultrasound transmitted and received with and against the flow on the measurement path. The total system of two measurement systems thus becomes one of three measurement systems, with this generalization being able to be extended to n measurement systems. All the features and advantages discussed with respect to two measurement systems can be transferred. The measurement systems are in particular independent and not synchronized with respect to the organization of their measurements and they fix their respective measurement time themselves in accordance with one of the described procedures. The number of measurement paths in each measurement system is preferably the same to obtain comparable measured values, but can also differ therefrom. The more measurement systems that are involved, the greater the mean time interval should preferably be selected between two measurement points to limit random collisions.

The fluid is preferably natural gas which again preferably flows in a pipeline. The ultrasound apparatus is therefore then used in large plant, for example for transnational natural gas deliveries.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
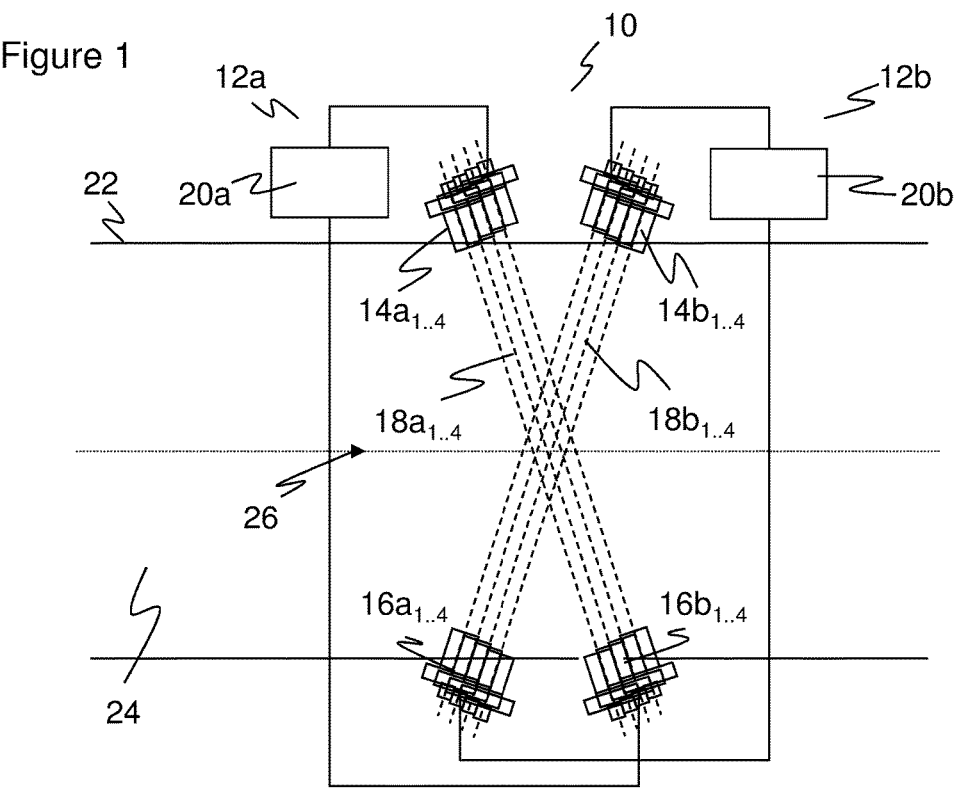
FIG. 1 a schematic plan view of an ultrasound measurement apparatus of two measurement systems each having four measurement paths.
Figure 2:
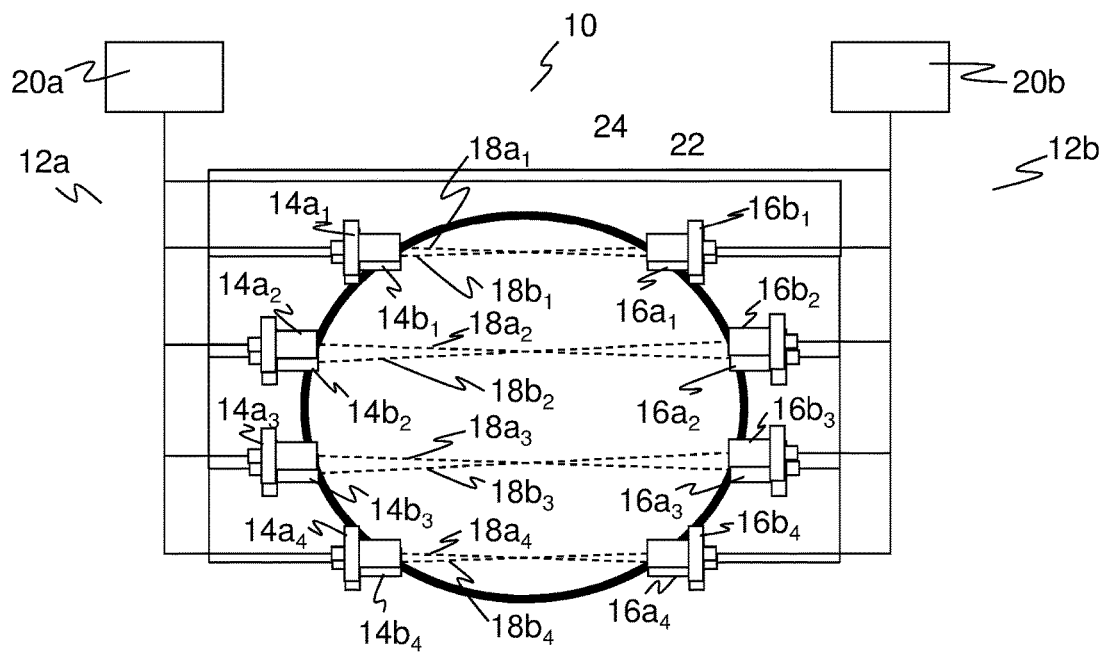
FIG. 2 a cross-sectional representation in accordance with FIG. 1.

FIG. 1 shows a schematic plan view of an ultrasound measurement apparatus 10 having two measurement systems 12$a$-$b$. FIG. 2 shows the ultrasound measurement apparatus 10 additionally in a cross-sectional representation.

Each measurement system 12$a$-$b$ has a respective four pairs of ultrasound transducers $14a_{1...4}$, $16a_{1...4}$, $14b_{1...4}$, $16b_{1...4}$, with a respective measurement path $18a_{1...4}$, $18b_{1...4}$ being spanned between each pair. The measurement systems 12$a$-$b$ thus each comprise four measurement paths $18a_{1...4}$, $18b_{1...4}$. In this respect, the specific geometry shown is to be understood purely by way of example both as regards the arrangement of the ultrasound transducers $14a_{1...4}$, $16a_{1...4}$, $14b_{1...4}$, $16b_{1...4}$ and the layout of the measurement paths $18a_{1...4}$, $18b_{1...4}$. The number 4+4 of the measurement paths $18a_{1...4}$, $18b_{1...4}$ is likewise purely by way of example. In an alternative ultrasound measurement apparatus 10, the number 2+2, 4+2, 4+1 can be selected or even differently again.

Each measurement system 12$a$-$b$ is still controlled by its own control unit 20$a$-$b$, with the first control unit 20$a$ of the first measurement system 12$a$ being connected to the associated first ultrasound transducers $14a_{1...4}$, $16a_{1...4}$ and accordingly being responsible for the associated measurement paths $18a_{1...4}$. The second control unit 20$b$ of the second measurement path 12$b$ is fully correspondingly connected to the associated second ultrasound transducers $14b_{1...4}$, $16a_{1...4}$ and is responsible for the associated measurement paths $18b_{1...4}$.

The basic principle of the flow measurement is the ultrasound-based transit time difference method that was described in the introduction. The ultrasound measurement apparatus 10 is therefore installed at a conduit 22 in which a fluid 24 flows in the arrow direction 26. Ultrasound signals are transmitted and received again on the respective measurement paths $18a_{1...4}$, $18b_{1...4}$ arranged at an angle to the flow direction or arrow direction 26, with and against the flow of the fluid 24, and their transit times are determined. Unlike the schematic, introductory example with only one measurement path, here the flow rate is determined a multiple of times over the different measurement paths $18a_{1...4}$, $18b_{1...4}$ so that a more exact result is achieved for the volume flow for non-homogeneous flows.

The ultrasound measurement apparatus 10 shown is a redundant 4+4 measurement apparatus due to the division into two measurement systems 12$a$-$b$. To actually achieve redundancy, the measurement procedures in the two measurement systems 12$a$-$b$ are controlled by the respective control unit 12$a$-$b$ without communication or synchronization. If the measurement results of the two measurement systems 12$a$-$b$ are combined at a higher level, this can also be considered an 8-path measurement apparatus.

It is to be avoided in this respect that both measurement systems 12$a$-$b$ measure cumulatively at the same times and thus deliver a poor measurement quality or are even no longer capable of measurement at all due to signal interference. The invention proposes different measures for this purpose that can be used individually or in combination.

A complete avoidance of collisions is not possible without synchronization. It can, however, very well be achieved that collisions are very rare or that no further collision occurs for as long as possible after a random collision. For this purpose, sequences of measurement times can be fixed in advance and can be stored in the control units 12$a$-$b$; or, alternatively, measurement times with respect to the transit time are fixed according to suitable rules in the control units 12$a$-$b$.

Figure 3:
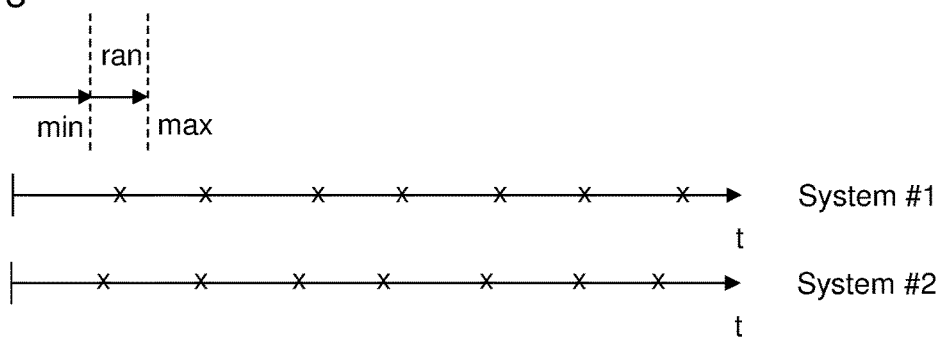
FIG. 3 a schematic representation of the measurement times in the two measurement systems with additional random delays.

FIG. 3 illustrates a first embodiment. In this respect, time axes are shown for each of the measurement systems on which the crosses show exemplary measurement times. In this embodiment, a parallel, simultaneous and independent operation of similar subsystems takes place without signal interference or with greatly reduced signal interference by a stochastic control of the transmission and reception processes required for a measurement. Specifically, a random waiting time is inserted before each transmission that initiates the respective measurement. The measurement times are thus effectively randomly fixed. It is advantageous if there is not any random selection, but rather that a minimum time interval is observed between two measurements because otherwise signal interference could even arise within one measurement system 12$a$-$b$. This can be expressed such that a random delay is added to a regular time pattern. FIG. 3 illustrates this as a condition with respect to a random time duration between two respective measurement times that has to be between a minimum value and a maximum value.

In the example of FIG. 3, collisions are completely avoided; that is no crosses lie on one another in time. In this respect, an approximate time coincidence is sufficient for a collision due to the finite measurement duration. Only sporadic collisions, that are not critical for the total measurement that is repeated constantly in practice, could also occur with less favorably fixed random values due to the random fixing.

Figure 4:
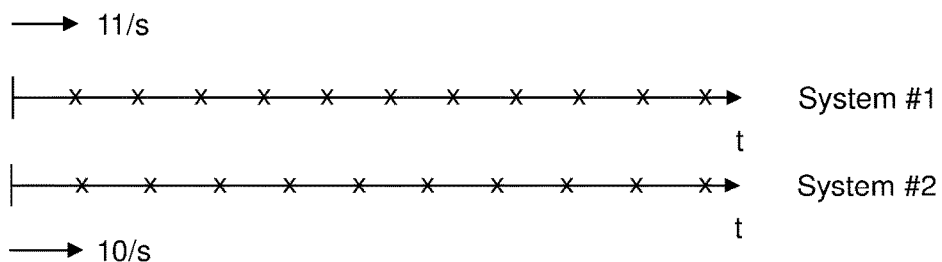
FIG. 4 a schematic representation of the measurement times in the two measurement systems with a coprime number of measurements per time unit.
Figure 5:
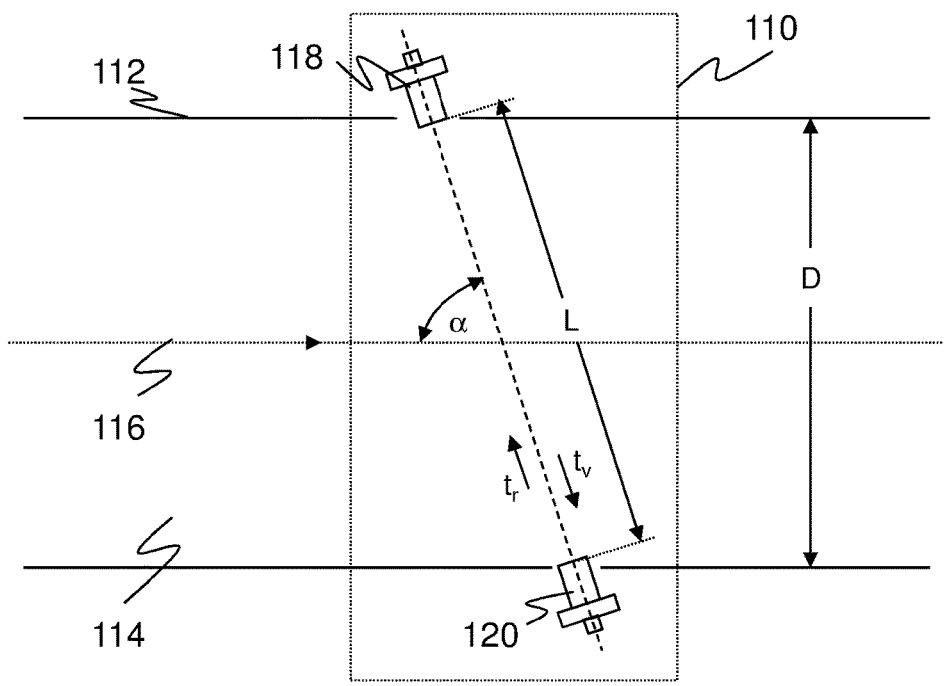
FIG. 5 a longitudinal sectional representation of an ultrasound measurement apparatus in accordance with the prior art for the explanation of the transit time difference method.

FIG. 4 illustrates a further embodiment. Here, both control units 20a-b fix the measurement times for their measurement systems 12a-b very regularly, but with different periods, that is time durations, between two measurements, in both measurement systems 12a-b. It is advantageous in this respect to select the periods such that no further collision follows for as long as possible after a collision, that is that a simultaneous transmission becomes very unlikely overall. A possibility for this is to select the number of measurements per time unit as coprime with respect to one another, for example ten measurements per second in the one measurement system 12a-b and eleven measurements per second in the other measurement system 12b-a. The coprime aspect is ensured when one of the rates is a prime number; however, this is not necessary, as the example eight/nine shows.

A coexistence strategy of the two measurement systems 12a-b can accordingly be based on coincidence and on systematic portions, as explained with respect to FIGS. 3 and 4. In a further embodiment, they can also be combined with one another. For example, the control units 20a-b select the measurement points as in FIG. 4 as regular with respective different periods and then delay them additionally by a random portion. The random delay should in this respect be restricted to brief durations since, if the random component becomes too large, the advantage of the systematic portion does not come into play at all.

It is advantageous in all the embodiments if not only the time sequence is random, as shown, but rather also the sequence of the measurements over the measurement paths $18a_{1...4}, 18b_{1...4}$ since the effect of signal interference also has a local dependency.

The invention claimed is:

1. An ultrasound measuring apparatus for measuring the flow rate of a fluid in a conduit, the ultrasound measuring apparatus comprising
    a first measurement system that has at least one pair of first ultrasound transducers that span a measurement path between one another and that has a first control unit to determine transit times of ultrasound transmitted and received with and against the flow on the measurement path; and
    a second measurement system that has at least one pair of second ultrasound transducers that span a measurement path between one another and that has a second control unit to determine transit times of ultrasound transmitted and received with and against the flow on the measurement path,
wherein the first control unit and the second control unit are each configured to fix measurement times for a transit time determination on a measurement path autonomously and independently of one another in accordance with a rule that produces a respective different sequence of the measurement times in both measurement systems.

2. The ultrasound measurement apparatus in accordance with claim 1, wherein at least one of the first control unit and the second control unit is configured to randomly fix at least one measurement time.

3. The ultrasound measurement apparatus in accordance with claim 2, wherein at least one of the first control unit and the second control unit is configured to randomly fix all the measurement times.

4. The ultrasound measurement apparatus in accordance with claim 1, wherein the first control unit and the second control unit are configured to fix the number of measurement times per time unit in the measurement systems coprime with respect to one another.

5. The ultrasound measurement apparatus in accordance with claim 4, wherein at least one of the first control unit and the second control unit is configured to additionally delay at least some measurement times by a random duration.

6. The ultrasound measurement apparatus in accordance with claim 1, wherein at least one of the first control unit and the second control unit is configured to carry out transit time measurements in a respective sequence through all measurement paths of the associated measurement system, wherein the sequence is randomly fixed.

7. The ultrasound measurement apparatus in accordance with claim 1, wherein a higher ranking control is provided that obtains measured values of the first control unit and of the second control unit and compares or offsets them with one another.

8. The ultrasound measurement apparatus in accordance with claim 1, wherein the first measurement system and the second measurement system each have a respective two pairs or a respective four pairs of ultrasound transducers and thus two or four measurement paths.

9. The ultrasound measurement apparatus in accordance with claim 1, wherein at least one third measurement system is provided that has at least one pair of third ultrasound transducers that each span a measurement path between each other and that has a third control unit to determine transit times of ultrasound transmitted and received with and against the flow on the measurement path.

10. The ultrasound measurement apparatus in accordance with claim 1, wherein the fluid is natural gas.

11. The ultrasound measurement apparatus in accordance with claim 1, wherein the conduit is a pipeline.

12. A method of measuring the flow rate of a fluid in a conduit, wherein transit times of ultrasound transmitted and received with and against the flow are determined on at least one measurement path of a first measurement system and on at least one measurement path of a second measurement system and the flow rate is calculated from the transit times,
    wherein measurement times for a transit time determination are fixed in the two measurement systems on a measurement path autonomously and independently of one another in accordance with a rule that produces a respective different sequence of the measurement times in the two measurement systems.

* * * * *